United States Patent [19]
Pirbazari et al.

[11] Patent Number: 5,505,841
[45] Date of Patent: Apr. 9, 1996

[54] MICROFILTRATION AND ADSORBENT PARTICLE SUSPENSION FOR REMOVING CONTAMINANTS FROM WATER

[76] Inventors: Massoud Pirbazari, 11634 Gorham Ave., Apt. 101, Los Angeles, Calif. 90049; Badri N. Badriyha, 2324½ Scarff St., Los Angeles, Calif. 90007

[21] Appl. No.: 484,140

[22] Filed: Jun. 7, 1995

Related U.S. Application Data

[63] Continuation of Ser. No. 668,264, Mar. 11, 1991, abandoned.

[51] Int. Cl.⁶ ................................................. B01D 61/04
[52] U.S. Cl. ........................ 210/90; 210/636; 210/639; 210/257.2; 210/500.26
[58] Field of Search .................. 210/636, 90, 94, 210/259, 257.2, 639, 85, 500.25, 500.26

[56] References Cited

U.S. PATENT DOCUMENTS 3,939,070  2/1976  Roth ........................................ 210/639
4,610,792  9/1986  Gils et al. ............................... 210/639

*Primary Examiner*—Frank Spear

[57] ABSTRACT

A novel system for removing contaminants from water utilizes a microfiltration membrane and an adsorbent particle suspension. In the preferred embodiment, the microfiltration membrane is a ceramic membrane and the adsorbent is powdered activated carbon. The adsorbent is added to the water to be decontaminated to form the suspension. The adsorbent particle suspension is recirculated from a recirculation reservoir through a tubular microfiltration membrane. Decontaminated water permeates from the membrane.

1 Claim, 6 Drawing Sheets

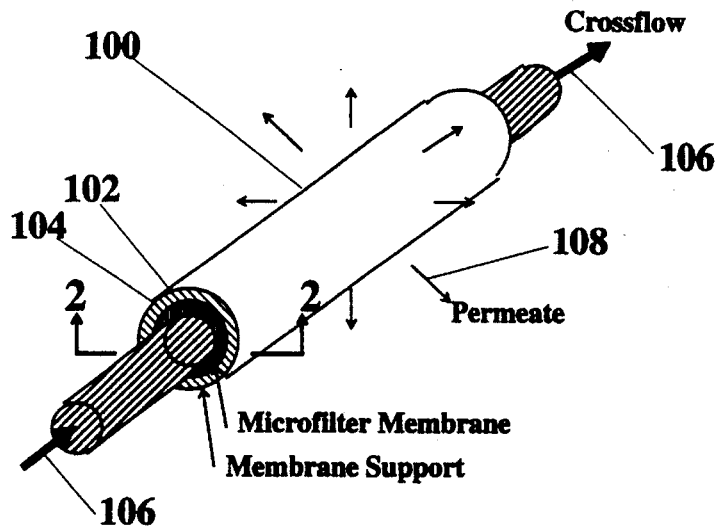
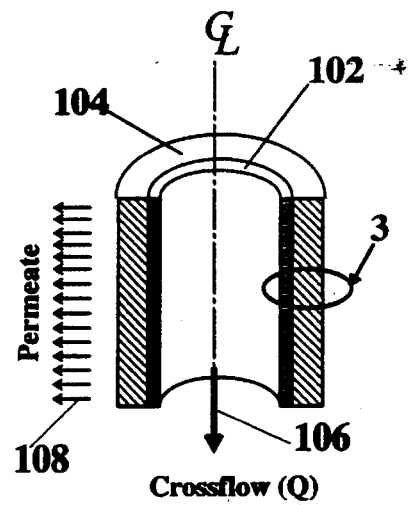
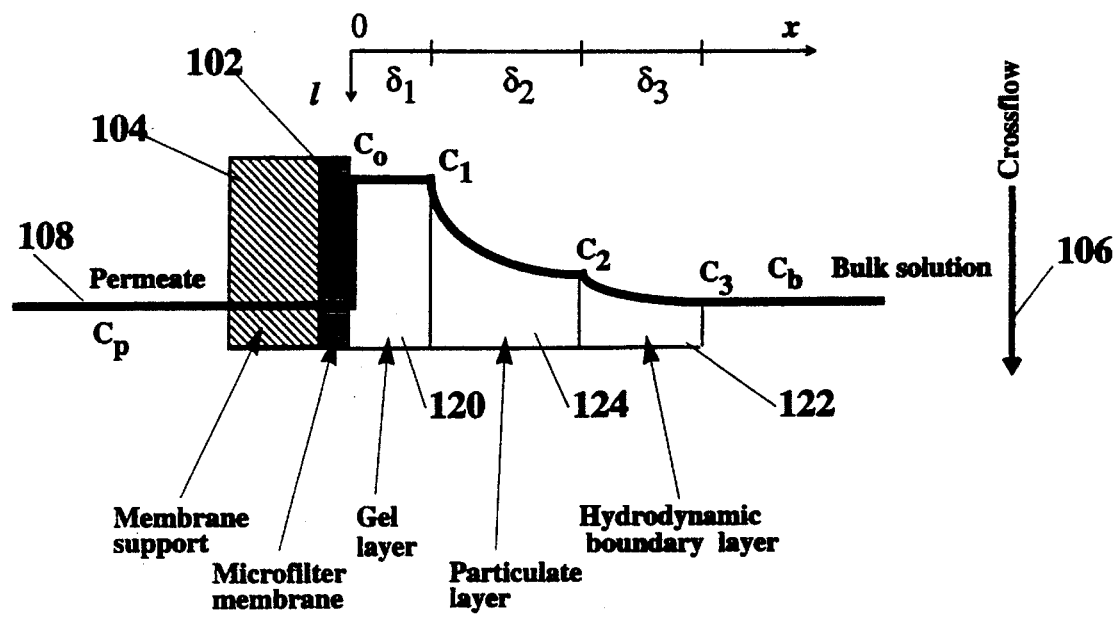

not to scale

MICROFILTRATION AND ADSORBENT PARTICLE SUSPENSION FOR REMOVING CONTAMINANTS FROM WATER

This application is a continuation of Ser. No. 07/668,262, filed Mar. 11, 1991, now abandoned.

FIELD OF THE INVENTION

The present invention relates to the removal of organic contaminants from water. More particularly, the present invention relates to the removal of organic contaminants from water through the use of an adsorbent particle suspension and a microfiltration membrane.

BACKGROUND OF THE INVENTION

Rapid industrialization of societies has led to a general increase in the production, application, and disposal of a broad spectrum of synthetic organic compounds. Most anthropogenic compounds find their way into surface and subsurface waters through industrial waste streams. Many anthropogenic compounds are hazardous, manifesting toxicity, carcinogenicity, and other insidious effects on human health. Development and application of cost-effective remedial technologies for protecting our limited water resources has therefore become an issue of great importance in recent years.

Different types of synthetic organic compounds have been encountered in groundwaters, among which volatile organic compounds such as trichloroethylene (TCE) and perchloroethylene (PCE) have been commonly identified in most surveys conducted across the United States. The U.S. Environmental Protection Agency (EPA) reviewed a number of strategies for aquifer remediation and treatment of waters polluted with volatile organic compounds, and recommended packed-tower air stripping and granular activated carbon adsorption as the best available technologies.

Packed-tower air stripping involves feeding a column with water from the top of the column and bubbling air from the bottom of the column through a packed bed. The air contacts the water and removes volatile organic compounds from the water by volatilization.

Air stripping alone is not efficient, especially for synthetic organic compounds. Moreover, the pollutants removed from the water by this process are released into the atmosphere and cause air pollution. Air stripping combined with granular activated carbon adsorption of the off-gases removed by air stripping is efficient but very expensive.

Granular activated carbon fixed-bed adsorption involves passing the water through granular activated carbon. It is expensive and not economically feasible for small systems. Both granular activated carbon fixed-bed adsorption and packed-tower air stripping require some pretreatment (such as coagulation, flocculation, sedimentation, and filtration) to remove suspended and colloidal matters, otherwise system fouling will increase operation and maintenance costs. Thus, there exists a need for an efficient and economical system for removing contaminants from water supplies.

One such contaminant in many water supplies which has captured much public concern is radon. Radon is a radioactive gas found mainly in ground water supplies. Radon concentrations as high as 750,000 pCi/L (picoCuries per liter) have been observed in public water supplies. Although there is currently no government standard for the maximum contaminant level for radon, the United States Environmental Protection Agency (EPA) has proposed adopting a maximum contaminant level for radon of 300 pCi/L.

Nearly 80% of the water for the Nation's 60,000 public water supplies come from groundwater sources. Thus, the risk of exposure to radon is immense. If the maximum contaminant level for radon proposed by the EPA is adopted, 30,000 drinking water utilities will be out of compliance. A greater risk of exposure to radon gas is imposed on populations served by smaller water utilities that obtain their water from small aquafiers which usually contain higher concentrations of radon.

Radon gas escapes from water at the point of use (i.e., at the faucet), thereby increasing indoor radon concentration levels to 10–20 times higher than that of outdoor concentrations of radon gas. Epidemeologic studies have shown that inhaled radon leads to lung cancer. However, recent studies have indicated that the number of fatal cancers attributed to radon ingestion from drinking water may be equal to the fatal lung cancers caused by radon inhalation. The lifetime risk due to exposure to radon is two orders of magnitude higher than that from natural uranium. Additionally, radon is responsible for 80% of the radionuclide-induced deaths in the United States.

Presently there is no acceptable method for removing radon from groundwater. Air stripping is unacceptable because it releases the removed radon into the atmosphere. Granular activated carbon absorption is similarly unacceptable because the carbon becomes contaminated with radioactive radon, thus creating a large disposal hazard. Additionally, granular activated carbon is expensive and not economically feasible for small systems.

U.S. Pat. No. 4,610,792 to Van Gils et al. discloses a technique integrating an ultrafiltration membrane process and powdered activated carbon adsorption for the removal of emulsified oil from laundry wastewaters. The adsorption technology disclosed, however, is inadequate for purification of waters contaminated with volatile organic compounds which will be used for human consumption.

Therefore, there exists a need for a non-polluting, economical system for effectively removing radon and other contaminants from water supplies.

SUMMARY OF THE INVENTION

The present invention combines microfiltration and adsorption techniques for efficiently and economically removing contaminants from water supplies. More particularly, the present invention achieves excellent results in the treatment of ground and surface waters contaminated with volatile organic compounds and other synthetic organic compounds such as pesticides, solvents, and polyaromatic hydrocarbons.

Briefly, the present invention involves the application of a microfiltration membrane with an adsorbent particle suspension. It can be implemented with equal effectiveness for small- or large-scale applications, requiring considerably lower land area in comparison with air stripping, granular activated carbon and other technologies. The addition of adsorbent to the microfiltration system results in the effective removal of contaminants (including, for example, radon) by adsorption, while the microfilter membrane separates out the adsorbent particles from the permeate.

The microfiltration and adsorbent particle suspension system has several advantages over conventional microfiltration processes which suffer from an endemic problem of permeate flux decline after prolonged operation due to membrane fouling. Membrane fouling problems are mitigated by the addition of the adsorbent particle suspension, and the adoption of appropriate fluid management techniques. The adsorbent discharges multiple functions as an effective adsorbent for contaminants, filter aid, and as an additive to mitigate membrane fouling.

The preferred embodiment of the present invention employs a reservoir for storing contaminated water. Adsorbent particles are combined with the contaminated water to form a suspension. The adsorbent particles remove the contaminants from the contaminated water by adsorption in order to obtain decontaminated water. The suspension of contaminated water, adsorbent particles and decontaminated water is stored in a recirculation reservoir. A membrane is used for separating the decontaminated water from the suspension. Decontaminated water permeates through the membrane while the remaining suspension is recirculated through the membrane and the recirculation reservoir.

A high recirculation rate is employed to maintain the system in a turbulent flow regime, so that the scrubbing effect of the adsorbent is enhanced. A high permeate flux can thus be maintained for long durations, which greatly improves the economic viability of membrane filtration.

An additional advantage of the microfiltration and adsorbent particle suspension system is that it is operated in a closed loop, so that there is no air pollution due to escapement of contaminants. Another merit of the microfiltration and adsorbent particle suspension process is that it requires relatively low operating pressures, so that the associated energy costs are substantially lower, in comparison with other membrane processes such as ultrafiltration and reverse osmosis where pressures as high as 150 and 600 psi are quite common. At ordinary operating pressures of 20–25 psi, a high permeate flux of over 250 gpd/ft$^2$ can be maintained for long durations in the microfiltration and adsorbent particle suspension system. Significantly higher fluxes are achievable if higher operating pressures are used. Higher operating pressures are possible because microfilters are more durable and can sustain pressures as high as 100 psi.

The microfiltration and adsorbent particle suspension process of the present invention was proven by example to be a very efficient and cost-effective technology for the removal of organic components from contaminated waters. The most important factor that determines the economics of the microfiltration and adsorbent particle suspension process of the present invention is the permeate flux that could be achieved. The permeate flux is enhanced by factors of two or three when powdered activated carbon is added to the suspension. This enhancement occurs for deionized distilled water as well as California Aqueduct water used in the microfiltration and adsorbent particle suspension system example.

The increase in permeate flux showed a direct correlation with the powdered activated carbon dosage. However, it was generally observed that at higher adsorbent dosages, the marginal increase in permeate flux as a function of adsorbent concentration gradually declined.

The significant improvement in flux at higher adsorbent concentrations in the case of deionized distilled water (where there is no potential for membrane fouling) could be attributed to enhanced permeate transport due to reduction in thickness of the hydrodynamic boundary layer.

In the case of California Aqueduct water, the improvement in membrane performance could be accounted for by the reduction in thickness of the hydrodynamic boundary layer as well as a decrease in the extent of membrane fouling due to pore blockage and gel formation.

The effect of crossflow velocity on membrane flux was quite significant. At higher crossflow velocities the permeate fluxes were lower, contrary to the belief that under more turbulent conditions the permeate transport would be enhanced. On the other hand, the pressure drop across the membrane module was found to increase approximately linearly with the crossflow velocity, resulting in a flux reduction. Regardless of the crossflow velocity, the permeate flux appeared to be a linear function of the transmembrane pressure, the principle driving force behind the microfiltration process.

Under the exemplary conditions employed, ceramic membranes were found to provide a higher permeate flux in comparison with polymeric membranes.

BRIEF DESCRIPTION OF THE DRAWINGS

FIG. 1 illustrates a crossflow tubular membrane as used the preferred embodiment of the present invention.

FIG. 2 is a cross section of the tubular membrane of FIG. 1.

FIG. 3 is a detailed illustration of a portion of FIG. 2, superimposed with a gel polarization model for membrane transport.

DETAILED DESCRIPTION OF THE PREFERRED EMBODIMENT

Membrane Process Applications

Figure 4:
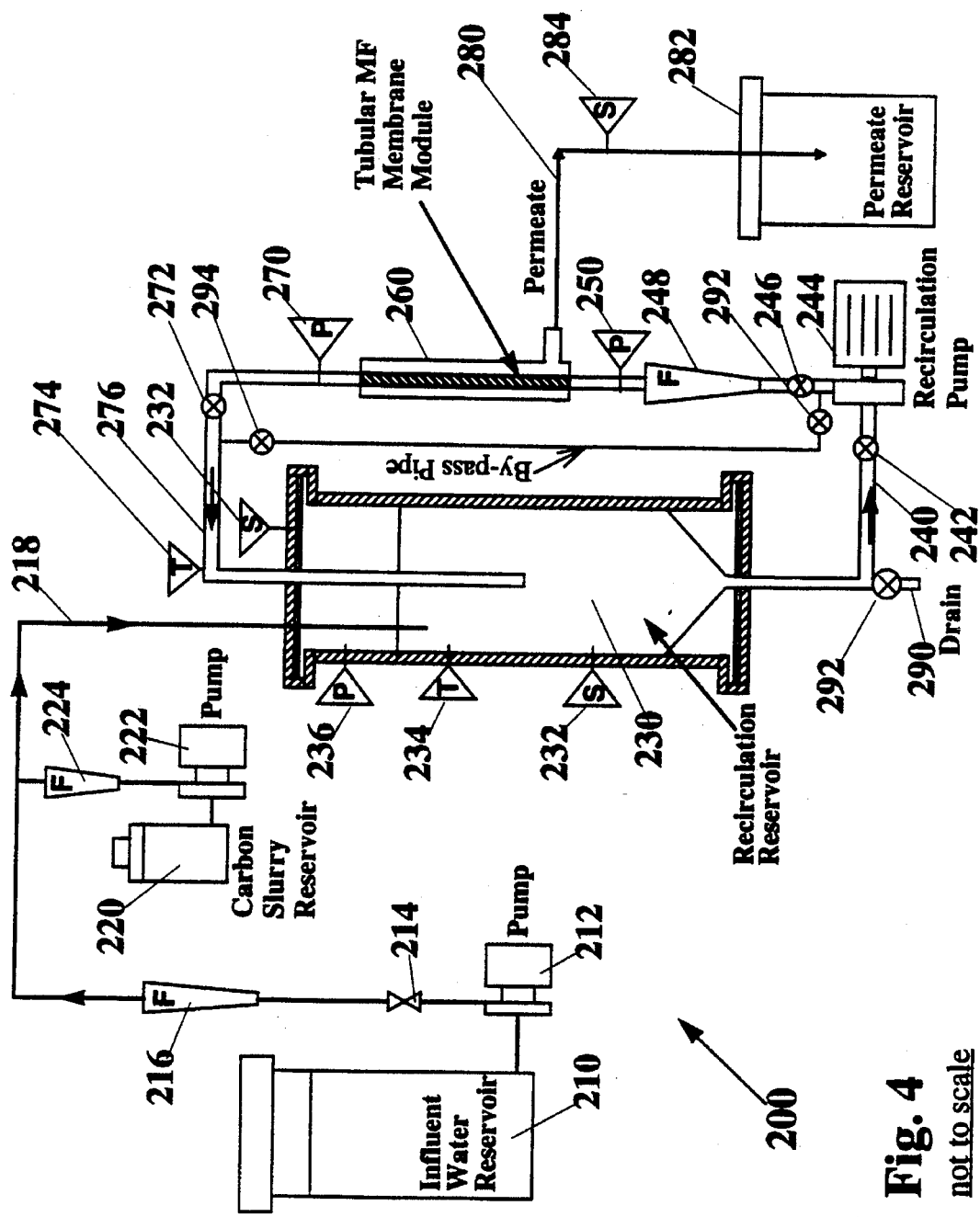
FIG. 4 illustrates a microfiltration and adsorbent particle suspension system constructed in accordance with the present invention.

Membrane technologies such as microfiltration, ultrafiltration, nanofiltration, reverse osmosis, and electrodialysis find several applications in water and wastewater treatment. All of these processes employ a synthetic membrane, which essentially acts as a barrier separating two phases that restricts the transport or passage of various chemical species in a specific manner. A membrane can be homogeneous or heterogeneous, symmetric or asymmetric in structure, solid or liquid, neutral or bipolar, hydrophilic or hydrophobic, and it may carry positive or negative charges. Its thickness may vary from less than 0.1 μm to over a centimeter. Membranes can thus be cast from a variety of materials with different properties or morphological characteristics.

Mass transport through a membrane may be caused by different mechanisms, such as molecular diffusion or convection, and may be induced by concentration, pressure, temperature gradients, or an electric field. The types of chemical species separated, the pore sizes of the membrane, and the size ranges of the chemical species within which the membrane is to operate determine the specific process employed. For instance, microfiltration membranes typically screen particles in the size range of 0.08–20 µm. Ultrafiltration membranes, on the other hand, filter colloidal solids and chemical species in the molecular or macromolecular size ranges of 0.002–0.2 µm, corresponding to approximate molecular weight ranges of 500–500,000. Nanofiltration membranes exclude small molecules and larger ions in the size range of 1–10 nm, corresponding to molecular weights of 200–10,000. Reverse osmosis membranes effectively separate out ionic species of sizes 0.1–1 nm, while electrodialysis membranes operate on an even smaller scale. The characteristics of membranes employed, therefore, differ markedly depending on the specific process application.

In recent years, membrane processes have become increasingly popular in water and wastewater treatment for a variety of reasons which include prospectively more stringent water quality regulations, inadequacy and deterioration of existing water resources, a shift to greater emphasis on water reclamation and reuse, declining capital investments due to lower land requirements, and reduced operation and maintenance costs due to advancements in membrane technology. More specifically, with regard to water treatment, interest in membrane technologies is further fueled by anticipated higher standards for turbidity, disinfection, and disinfection by-products. Other potential advantages of membrane processes include production of better quality effluent, application of fewer chemicals in treatment systems, and no destruction of sensitive materials. Specifically, microfiltration and ultrafiltration systems have a few additional merits in comparison with reverse osmosis and electrodialysis processes, such as low energy requirements (because there is no phase change), low operating temperatures and pressures, and the ease of upscaling small systems into full-scale units.

There have been many ultrafiltration applications in water treatment. Ultrafiltration systems have been found through extensive studies to be more economical than chemical processes for purification of groundwater. Ultrafiltration can effectively remove trihalomethane precursors, such as humic substances, from water.

Major differences exist between ultrafiltration/powdered activated carbon processes and microfiltration and adsorbent particle suspension processes. The former employs a ultrafiltration membrane whose morphological characteristics are different from those of microfiltration membranes. Microfiltration membranes usually have capillary pores or networks of pores 0.2–2.0 µm at a size that are more frequently distributed and larger than those of ultrafiltration membranes by at least an order of magnitude or two. Thus, the fabrication technology for ultrafiltration and microfiltration membranes are very different. Another important difference is that the flux obtainable in a microfiltration and adsorbent particle suspension process is far higher than that realized in an ultrafiltration/powdered activated carbon process because the former employs membranes with relatively higher permeability. Additionally, the ultrafiltration/powdered activated carbon process utilizes the membrane for the exclusion of organic molecules. However, in the microfiltration and adsorbent particle suspension process, the organic or inorganic molecules can easily pass through the microfiltration pores, but their removal is achieved entirely by adsorption, and the membrane is employed only for the exclusion of the adsorbent particles.

The application of a microfiltration process for the decontamination of water polluted with organic compounds has not been considered thus far because microfiltration systems cannot screen or remove smaller organic molecules by themselves. The present invention, however, is a combination of microfiltration and adsorbent particle suspension processes. In the application of the microfiltration and adsorbent particle suspension process, contaminant removal is achieved through adsorption by the adsorbent particle suspension, while the adsorbent particles are effectively separated from the permeate stream at the membrane interface. The microfiltration and adsorbent particle suspension process is more effective than the ultrafiltration process in its degree of separation of contaminants. Additionally, the microfiltration and adsorbent particle suspension process achieves a higher permeate flux.

The advantages of using a microfiltration membrane instead of an ultrafiltration membrane are numerous. Besides making higher permeate fluxes achievable at lower cost, microfiltration membranes are less susceptible to problems caused by fouling, as will be discussed later.

Driving Forces and Permeate Fluxes in Membrane Processes

Separations in membrane processes are achieved due to differences in transport rates of chemical species through the membrane interface. These transport rates are determined essentially by two factors, the mobilities and the concentrations of the chemical species within the interface. The mobilities are primarily dependent on the molecular sizes of solutes (or the particle sizes in the case of suspensions) and the membrane structure. The driving force for the transport is provided by the electrochemical potential gradient of each component across the membrane. Such gradients can be caused by differences in hydrostatic pressure, concentration, temperature, or electric potential between the two phases separated. The permeate or solvent flux produced by a given driving force is determined by the mobility and concentration of the solute.

Mass transport in a membrane is a nonequilibrium process, and is governed by phenomenological equations such as Fick's law, which relates the material flux with the driving forces (concentration gradient in the case of Fick's law). These driving forces (such as pressure differences, concentration gradients, and electric potentials) may often be interdependent, leading to other effects. For example, in reverse osmosis applications, a pressure difference between the two phases separated by a membrane results in the separation of a chemical species due to variations in hydrodynamic permeabilities of the membrane for different components. In the case of ultrafiltration processes, the concentration differences between the two phases separated by the membrane facilitates the separation of various components due to differences in their diffusivities. In the electrodialysis process, the difference in electric potential leads to separation of different species due to differences in their electric charges, mobilities and concentrations. The electrically charged membrane excludes ions that carry the same charge as the membrane material.

In microfiltration processes, the exclusion of particles in suspension is achieved by applying a relatively small pressure difference across the membrane. Transport of permeate occurs due to viscous flow through the pores. The permeate transport rates are substantially higher in microfiltration than in ultrafiltration or reverse osmosis processes, where the mass transfer is controlled by the slow diffusion process. In microfiltration, however, the permeate transport is controlled by viscous flow through membrane pores, which is relatively faster. Hence, it is advantageous to use microfiltration instead of an ultrafiltration process for the exclusion of suspended solids. This is an important consideration in the application of the microfiltration and adsorbent particle suspension process over an ultrafiltration process because the pollutant removal in microfiltration is achieved by particulate adsorption and the membrane merely separates out the adsorbent particles. The operation of a microfiltration and adsorbent particle suspension process in a continuous mode with recycling provides sufficient contact time for maximum utilization of adsorbent capacity. In short, the integration of microfiltration and adsorption enhances the performance of each process.

Problems Experienced in Membrane Processes

One of the most serious problems in membrane technologies is the decline of permeate flux due to membrane fouling and gel formation. The term "membrane fouling" comprehensively refers to plugging of pores and external pore blocking due to solids deposited on the membrane surface. The term "gel formation" specifically refers to the layer formed on the surface due to concentration polarization. The gel layer is formed at the membrane liquid interface where larger solute molecules excluded from the permeate form a coating. In microfiltration applications, the fouling caused by solids or colloids deposited on the membrane surface, or gel formation, is reversible and can be overcome by periodic membrane cleaning. On the other hand, the plugging caused by colloids trapped within the pores is usually irreversible and requires membrane replacement.

The layer of solids deposited on the surface forms a cake which enhances filtration of suspended particles as in a conventional media filter. If the cake formed is incompressible, it does not contribute significantly to the overall mass-transfer resistance. Nevertheless, compressible cakes have relatively low permeabilities, and often lead to gradual deterioration of permeate flux.

A number of strategies have been adopted in the present invention to solve membrane fouling and gel formation problems and improve the economic viability of microfiltration processes. In this regard, the choice of appropriate membrane geometry and configuration is important.

Module Geometry, Configuration, and Operation

Microfiltration modules are manufactured in different geometries. The most favored type are the tubular membranes because they are least susceptible to fouling for streams containing large flocs or particles. Multichannel filters are preferred to single channel filters in certain applications because they can provide a higher membrane surface-to-volume ratio. However, in the case of the high concentrations of suspended solids with potential for surface fouling, a higher degree of turbulence in fluid flow is necessary, and single tubes of larger diameters are preferred.

Another important aspect for consideration besides membrane module geometry and configuration, is its mode of operation. Two modes of operation are commonly employed: throughflow filtration (which is also called dead-end filtration) and crossflow filtration. In throughflow filtration, the transmembrane pressure applied drives the entire suspension through the filter medium. The suspended solids either remain on the surface of the medium, get trapped within its pores or pass through it with the filtrate. In the case of crossflow filtration, the pressure drives a portion of the suspension through the medium while the remaining suspension flows tangential to the membrane surface, continually removing the solid particles from the surface back into the suspension. Because the permeate flux is not so much dependent on the transmembrane pressure, its susceptibility to membrane fouling is reduced.

Throughflow filtration can be used to separate particles down to a diameter of 0.1 µm, but crossflow filtration can be used to separate particles ranging in size from 10 to 0.001 µm. The tangential fluid flow in crossflow filtration maintains sufficient turbulence to facilitate enhanced back diffusion transport of solids or colloids that tend to accumulate on the membrane surface. Another advantage of crossflow filtration, although less significant, is that the solids in the retentate can be concentrated from as low as 1 mg/L to as high as 700 g/L, facilitating the recovery of solids.

Choice of Membrane Materials

The choice of the most appropriate membrane material for a certain application is commonly based on the following criteria: (i) chemical inertness of the suspension; (ii) resistance to irreversible pore plugging; and (iii) mechanical stability of operating temperature and pressure. The last criterion is very important because the membrane pore-size must not change due to prolonged usage, and the material must not soften, crack, or suffer damage or any form of mechanical failure. The material selection process may be greatly aided if information is available on the particle size distribution of the suspension filtered, concentrations of suspension, products and suspended solids, expected volumetric permeate flux, chemical composition of the suspension and operating conditions (such as temperature, pressure, and pH).

Membranes are manufactured of different materials, including polymers, ceramics, sintered metals, and carbon. Ceramics, sintered metals, and carbon generally possess material properties superior to those of polymers, and are chemically and thermally more resistant. For the purposes of the present invention, as will be explained later, ceramic membrances are preferred. For hot or corrosive liquid streams, these materials are preferred to polymers such as acrylics, cellulosics and polysulfones. Additionally, ceramic membranes have a much higher durability than all other membranes, and can be used for a larger variety of applications. Ceramic materials are not amenable to material creep or flow, unlike polymers, and often have a service life of even ten years. Polymeric membranes, however, can be maintained in service only for a year or two. In addition to these advantages, ceramics are resistant to chemical treatment, and therefore can be periodically cleaned using solutions containing acids, alkalies, oxidants, detergents, or organic solvents to ameliorate flux decline caused by pore plugging. This not only prolongs the active life of the membrane, but also enhances its functional efficiency.

Referring now to FIG. 1, a tubular membrane 100 as used in the present invention is illustrated. The tubular membrane 100 may be a multi-channel membrane, as discussed above. The tubular membrane 100 is shown in FIG. 1 as a single channel membrane for easier illustration.

The tubular membrane 100 comprises a microfilter membrane 102, preferably a ceramic membrane, and a membrane support 104. The membrane support 104 gives structural support to the delicate microfilter membrane 102.

The crossflow path of the water suspension is shown at 106. As the suspension flows through the tubular membrane 100, the permeate 108 permeates from the tubular membrane 100.

FIG. 2 is a cross section of the tubular membrane 100 of FIG. 1 taken along the line 2—2. FIG. 3 is a detail of the encircled area 3 in the cross section illustrated in FIG. 2.

Factors Affecting Permeate Flux

One of the most serious problems of membrane processes is the decline in flux due to membrane fouling and gel formation, as mentioned above. Gel formation is caused by the effects of concentration polarization at the membrane surface. Gel formation offers a significantly high resistance to membrane transport. As shown in FIG. 3, a gel layer 120 results from gel formation. Another factor that enhances this resistance is low diffusivity through a boundary layer 122 that exists between a particulate layer 124 and the bulk solution (water suspension) 126 as shown in FIG. 3. Reduction in the thickness of this boundary layer is therefore an important consideration for improving the volumetric permeate flux. A qualitative appreciation of the gel, particulate and boundary layer formations and their impact on transmembrane flux is important for devising methods to control polarization effects and reduce the boundary layer thickness. The gel permeation model described in the ensuing section provides a qualitative explanation for analyzing various factors that control permeate flux.

Gel Polarization Model for Membrane Transport

The gel polarization model described here provides an adequate qualitative description of membrane transport for the microfiltration and adsorbent particle suspension process. The model is essentially based on the film theory and the relative diffusivities of the solute through these layers. This aspect is important because the back diffusion of the solute from the microfilter membrane 102 surface into the bulk solution 126 mitigates concentration polarization effects. A brief description of the model is necessary before the fundamental mass transfer relationships can be discussed.

The proposed model recognizes the formation of three layers over the membrane surface that cause resistance to back diffusion, as shown in FIG. 3: (i) a thin gel layer 120 through which solute diffusion is very low; (ii) a second layer 124 formed by particulates, colloids, and suspended solids; and (iii) a boundary layer 122 formed between the particulate layer 124 and the bulk solution 126 in the turbulent flow regime that exists in the bulk solution 126. The particulate layer 124 and boundary layer 122 are relatively thicker than the gel layer 120, but their solute permeabilities are considerably higher. The three layers can be assumed homogeneous, although solute concentration gradients exist across them.

The membrane transport of the solute under unsteady-state conditions can be represented by the advection equation:

$$\frac{\partial C}{\partial t} - J_v \frac{\partial C}{\partial x} = D_i \frac{\partial^2 C}{\partial x^2} \quad \text{for } i = 1 \text{ to } 3 \tag{1}$$

Here, C denotes the solute concentration, x the distance from the membrane, and t the time variable. The solute diffusivity through layer "i," and the layer thickness are denoted by $D_i$, and $\delta_i$, respectively. The subscripts 1, 2, and 3 represent the gel layer 120, particulate layer 124, and boundary layer 122, respectively.

The initial boundary conditions can be specified as follows:

$$t=0: C=C_b \tag{2}$$

$$x=x_i: C=C_i \text{ for } i=2, 3 \tag{3}$$

where $C_i$ represents the solute concentration at the interface between the ith and (i+1)th layer, and $C_b$ denotes the solute concentration in the bulk fluid. According to the notations used, $$x_i = \sum_{j=1}^{i} \delta_j$$

for i=1 to 3, and $x_o$=0. Under steady-state conditions, eq. (1) becomes $$-J_v \frac{dC}{dx} = D_i \frac{d^2C}{dx^2} \quad \text{for } i = 1 \text{ to } 3 \tag{4}$$

Besides the Dirichlet boundary conditions, Neuman boundary conditions must be incorporated to establish the solute flux balance at the interfaces, which must be satisfied under steady-state conditions. The solute flux boundary conditions between adjacent layers designated as "i" and "i+1" can be written as $$x=x_i: D_i \frac{dC}{dx}\bigg|x_i- = D_{i+1}\frac{dC}{dx}\bigg|x_i+ \tag{5}$$

At the membrane-gel interface, $$x=x_o: J_v(C_o - C_p) = -D_l \frac{dC}{dx} \tag{6}$$

The system of differential equations can be solved with the boundary conditions mentioned above. The concentration at any layer i given defined by $x_{i-1} \leq x \leq x_i$ can be written in a convenient form as $$\frac{C-C_p}{C_o-C_p} = \exp\left\{ \sum_{j=1}^{i-1} (-J_v \delta_j/D_j) \right\} \tag{7}$$

$$\exp\{-J_v(x-x_{i-1})/D_i\} \text{ for } i = 1, 2$$

The concentrations $C_{i-1}$ and $C_i$ at successive interfaces defined by $x=x_{i-1}$ and $x=x_j$, respectively, can be related by $$\frac{C_i-C_p}{C_{i-1}-C_p} = \exp\{-J_v \delta_i/D_i\} \text{ for } i = 1 \text{ to } 3 \tag{8}$$

Here, $C_o$ represents the solute concentration of the gel in contact with the membrane. The solute flux relationships can be written independently for the three layers by rearranging eq. (8) as $$J_v = \frac{D_i}{\delta_i} \ln \frac{C_{i-1}-C_p}{C_i-C_p} \quad \text{for } i = 1 \text{ to } 3 \tag{9}$$

The mass transfer coefficient, $k_i$, for each layer "i" is defined as $D_i/\delta_i$, and the above relation takes the form $$J_v = k_i \ln \frac{C_{i-1}-C_p}{C_i-C_p} \quad \text{for } i = 1 \text{ to } 3 \tag{10}$$

The solute mass transfer coefficient in the turbulent zone considerably higher than those in the three layers, and it is therefore logical to approximate $C_3$ to the bulk solute concentration $C_b$, considering eq. (6). The mass transfer resistance will be significant only in the three principal layers, and the flux relationship in terms of the gel concentration, $C_o$, and the bulk concentration, $C_b$, can be obtained by considering the resistance of the three layers in series as follows:

$$\frac{C_o - C_p}{C_b - C_p} = \exp\left\{ J_v \sum_{j=1}^{3} \frac{\delta_j}{D_j} \right\} \quad (11)$$

It should be noted that the permeate solute concentration $C_p$ will be very low if the removal of the pollutant by the adsorbent is very effective.

The role of adsorbent particles in mitigating concentration polarization effects can be explained in the light of the above solute flux relationships. The adsorbent particles form a dynamic layer over the gel and adsorb the solute molecules effectively. As a result, the effective thickness $\delta_1$ of the gel layer 120 is potentially reduced. This is indeed an important aspect because the solute diffusion through the gel layer 120 is considerably slower than that through the particulate (adsorbent) layer 124, and this resistance to mass transfer must be minimized. The reduction in gel layer 120 thickness due to adsorbent particles may exceed a factor of 40 or 60. The particulate layer 124 and the boundary layer 122 have relatively higher mass-transfer coefficients and may not significantly affect the overall permeate flux. The scrubbing effect of the adsorbent, in addition to enhancing the permeate flux, leads to better effluent quality. The adsorption of adsorbent particles on the membrane reduces the potential plugging of the internal pores of the membrane and maintains high permeability of the solute through the membrane. The boundary layer 122 thickness 63 is another important factor controlling the permeate flux because its value is relatively higher than the gel layer 120 thickness, although diffusion rates through this layer are higher than through the gel layer. The use of powdered activated carbon tends to mitigate polarization effects by reducing the boundary layer thickness significantly. The application of powdered activated carbon in the adsorbent particle suspension contributes to better organic effluent quality in the case of organic contaminants due to its excellent adsorption characteristics.

Adsorption-Microfiltration Studies

Referring now to FIG. 4, a microfiltration/absorbent particle suspension system constructed in accordance with the present invention is shown at 200. Water containing contaminants to be removed by the system 200 is stored in an influent water reservoir 210. A pump 212 pumps the water from the influent water reservoir 210 through a needle-valve 214 and then through a flow meter 216 to an input pipe 218.

Powdered activated carbon (or other adsorbent) is stored in a carbon slurry reservoir 220. A pump 222 pumps the powdered activated carbon from the carbon slurry reservoir 220 through a flow meter 224 into the input pipe 218 containing the water.

The input pipe 218 directs the water and powdered activated carbon suspension into a recirculation reservoir 230. Recirculation reservoir 230 holds the water and absorbent particle suspension. Reservoir 230 preferably contains one or more sampling ports 232, temperature probes 234, and pressure gauges 236. The suspension is removed from the recirculation reservoir 230 through a recirculation output pipe 240. A ball valve 242 is preferably located in the recirculation output pipe 240. A recirculation pump 244 pumps the suspension from the recirculation output pipe 240 through a ball valve 246, a flow meter 248, a pressure gauge 250 and into a tubular membrane 260. The tubular membrane 260 is preferably ceramic and is constructed as the tubular membrane 100 shown in FIGS. 1 and 2. From the tubular membrane 260, the suspension is pumped through a pressure gauge 270, a ball valve 272, a temperature probe 274, and back into the recirculation reservoir 230.

The permeate from the tubular membrane 260 flows through a permeate output pipe 280 into a permeate reservoir 282. The permeate output pipe 280 preferably contains a sampling port 284 for sampling the permeate water. The permeate water in the permeate reservoir 282 has had contaminants removed by the system.

A drain 290 is preferably located in the recirculation output pipe 240. A ball valve 292 is connected between the drain 290 and the recirculation output pipe 240. The drain 290 is used to drain the recirculation reservoir 230 of the suspension and for periodic maintenance of the system.

The recirculation pump 244 is preferably a positive displacement pump. A positive displacement pump does not add any kinetic energy to the suspension being recirculated. Other kinds of pumps, however, can add energy to the suspension and thereby cause the suspension to increase in temperature. This increase in temperature would then require the use of a cooling coil in the recirculation reservoir 230 so that the temperature of the suspension would not increase beyond tolerable temperatures. A positive displacement pump avoids this problem.

An additional advantage of a positive displacement pump used for the recirculation pump 244 is that cheaper powdered activated carbon (or other adsorbent) may be used in the system than with other types of pumps. With other types of pumps, such as a centrifugal pump, the pump can pulverize the carbon and thereby create carbon particles which can clog or flow through the tubular membrane 260. With the use of such pumps, it is necessary to use carbon that is more resistant to attrition. Such carbon is more expensive. Because a positive displacement pump does not pulverize the carbon, cheaper carbon which is not as resistant to attrition may be used.

The system of the present invention may optionally include a bypass pipe 290 connected between the recirculation pump 244 and the recirculation input pipe 276. The bypass pipe 290 has a ball valve 292 at one end and a ball valve 294 at the other end.

The suspension stream is allowed to flow through the microfilter tubes at fluid velocities with Reynolds numbers in the range of 20,000–40,000, representative of turbulent flow regimes, in order to minimize problems associated with concentration polarization and to increase mass transport from the solution phase to the adsorbent phase. A fraction of the aqueous phase permeates through the membrane pores, driven by a hydraulic pressure gradient. The aqueous stream enriched with solids will be passed along the membrane and recirculated back into the recirculation reservoir. The powdered activated carbon is then added to the influent stream at appropriate concentrations to achieve desired removal efficiencies. The entire unit is operated as a closed system (so that there is no air pollution) and the spent adsorbent is withdrawn periodically for regeneration.

Adsorbent Particle Suspension

A variety of adsorbents can be used in the adsorbent particle suspension, either individually or in combination, including activated silica, synthetic polymers, zeolite, activated alumina, and powdered activated carbon. Other types of powder adsorbents commonly used for metal removal can also be employed in the present invention. However, for the removal of organic contaminants and radon from ground or surface waters, powdered activated carbon serves as the best possible adsorbent.

A number of different activated carbons are commercially available, and the selection of a suitable one is based on a number of criteria such as adsorptive performance for a certain application, cost effectiveness, carbon raw material, total surface area per unit weight, pore-size distribution, and the specific application. However, the first two criteria are important for determining the suitability of a type of carbon for any application. The adsorptive efficiency can be assessed by adsorption equilibrium studies. The attributes to cost effectiveness are the initial carbon cost and the resistance to attrition during turbulent fluid flow and regeneration. An exemplary powdered activated carbon which can be used in is the Calgon WPH type (available from Calgon Corporation, Pittsburgh, Pa.), which is of bituminous origin. The size of the powdered activated carbon particles is preferably smaller than 325 mesh. This carbon possesses a low attrition value, and a high uniformity (95% of the powdered activated carbon passing through the 325 mesh, which corresponds to a particle size smaller than or equal to 45 μm).

Microfilter Membranes

Different types of microfilter membranes can be used. One type is a polymeric membrane manufactured of cellulose acetate by Ionics, Inc. (Watertown, Mass.). The membrane preferred for the present invention is a ceramic membrane made of α-alumina (available from ALCOA, Pittsburgh, Pa.). The membrane is preferably a tubular type, consisting of a single channel, as shown in FIGS. 1 and 2, with the thin microfilter membrane 102 being cast over a thicker pourous membrane support 104 layer.

EXAMPLE

The following example discusses the effectiveness of an exemplary microfiltration and adsorbent particle suspension system constructed in accordance with the present invention wherein powdered activated carbon was used as the adsorbent for treatment of water containing TCE at concentrations encountered in typical groundwater contamination situations. The rationale behind the choice of TCE as a model test compound stems from the fact that it is one of the common compounds identified in contaminated aquifers and that it is relatively poorly adsorbable in relation to other synthetic organic compounds (the present invention is even better suited for more easily adsorbable pollutants). Reagent grade TCE purchased from J. T. Baker and Co. (Phillipsburg, N.J.) was used as the model pollutant in the experiments.

Background Solutions

Three background solutions were used in experiments conducted with the exemplary system, namely deionized distilled water (DDW), raw California Aqueduct Water (CAW), and tap water. The tap water was passed through a granular activated carbon (Calgon F-400) filter with an empty bed contact time of 15 minutes for the removal of trace organics. It is to be noted that the tap water is of the same origin as the California Aqueduct water.

Experiments were conducted with the microfiltration and adsorbent particle suspension system to examine the process efficiency for organic contaminant (TCE) removal, and to qualitatively investigate the factors that influenced the permeate flux such as powdered activated carbon concentration, crossflow tangential fluid velocity across the membrane, and the pressure applied along the membrane module. The study also involved a detailed comparison of the relative performances of cellulose acetate and the ceramic membranes, and the permeate flux for deionized distilled water, California Aqueduct water, and waters consisting of different background substances. Water containing radon contamination was also tested in the system.

Analytical Techniques

The permeate samples obtained from the microfiltration and adsorbent particle suspension system were analyzed for TCE concentrations by gas chromatography. Extracts of permeate samples in isooctane (2,2,4-trimethylpentane) were prepared and injected into a HP 5790A (Hewlett Packard) gas chromatograph equipped with an electron capture detector and interfaced with an HP 3390A recorder integrator. The chromatographic column consisted of a glass tube of length 2.5 m and internal diameter 2 mm, packed with polyethylene glycol (0.2% Carbowax 1500, 60–70 Carbopack C; available from Supelco, Bellefonte, Pa.). The column was operated with injector, oven and detector temperatures of 150°, 120° and 250° C., respectively. The carrier gas was a mixture of 95% argon and 5% methane, maintained at a flow rate of 40 mL/min.

Removal of the Organic Contaminant

Figure 5:
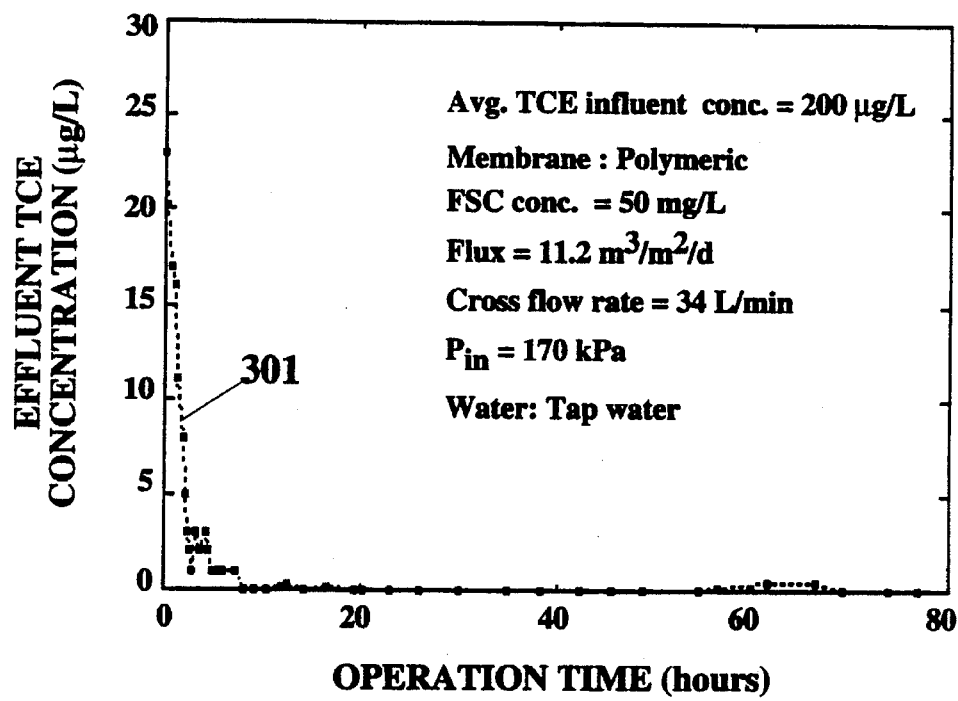
FIG. 5 is a graph illustrating the removal of TCE from water by a system constructed in accordance with the present invention.

The microfiltration and adsorbent particle suspension process was found to be efficient in removing the organic contaminant TCE from water even at trace levels, as shown in FIG. 5. Curve 301 in the graph of FIG. 5 illustrates the removal of TCE over time. The average influent TCE and powdered activated carbon concentrations were maintained at 200 μg/L and 50 mg/L, respectively. The steady-state effluent concentration of the contaminant was found to be in the range of 0.2–0.5 μg/L, corresponding to removals exceeding 99.5%, even when the pollutant was present in trace concentrations.

The high effectiveness of the process for TCE removal by powdered activated carbon adsorption has an important significance in determining the applicability of microfiltration and adsorbent particle suspension system technology for removal of other organic contaminants. The adsorbability of TCE on activated carbon is relatively low in comparison with those of most other organic contaminants, so the process is potentially more effective for a larger variety of organic pollutants. In addition to the high effectiveness of the system, no pre-treatment and no post-treatment steps are necessary to achieve these superior results, unlike other available systems.

Radon Removal

The microfiltration and adsorbent particle suspension method of the present invention is also very effective in removing radon from water. Sample groundwater was used to test the system's effectiveness for removing radon. Water containing radon concentrations of 2650 pCi/L (almost ten times the proposed maximum contaminant level for radon of 300 pCi/L) was used. Powdered activated carbon was added to the system and the water and carbon mixture was recirculated through the membrane module. Samples from the permeate were analyzed for radon concentration. Radon concentration in the permeate was found to be below the detection limit of the analytical technique for measuring radon (10–15 pCi/L), at least twenty times below the maximum contaminant level of 300 pCi/L.

These results demonstrate that the microfiltration/absorbent particle suspension system of the present invention is very effective and economical for removal of radon from water. Furthermore, because the system is air-tight, no radon is released into the atmosphere during the removal process. Although the powdered activated carbon becomes contaminated with radon, the volume of powdered activated carbon which must be disposed of safely is much smaller than that for granular activated carbon for an equal amount of radon removed. This is because the smaller particulate size of the powdered activated carbon yields a larger surface area for adsorption of contaminants for an equal volume of carbon.

Effect of powdered activated carbon Concentration on Permeate Flux

Figure 6:
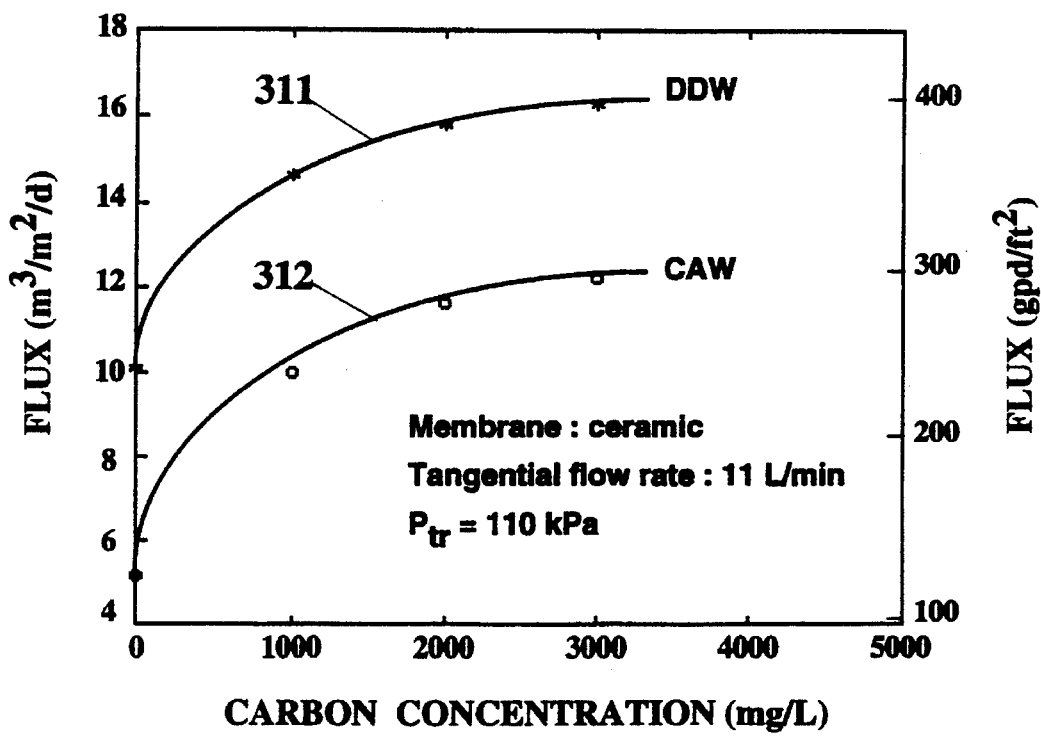
FIG. 6 is a graph illustrating the effect of carbon concentration on permeate flux in a system constructed in accordance with the present invention.

The microfiltration and adsorbent particle suspension process was operated for two different waters, namely, deionized distilled water (DDW) and California Aqueduct water (CAW), so that the effect of powdered activated carbon concentration on permeate flux could be estimated. The results of these experimental runs are shown in the graph illustrated in FIG. 6. FIG. 6 shows that in the case of deionized distilled water (curve 311) the flux was enhanced from 10 to 14.5 $m^3/m^2/d$ when the powdered activated carbon concentration was increased from 0 to 1,000 mg/L. A further increase in powdered activated carbon levels to 3,000 mg/L resulted in a flux of 16.3 $m^3/m^2.d$. It can be observed that the marginial improvement in flux gradually decreases as the powdered activated carbon concentration increases.

Qualitatively similar results were obtained for the California Aqueduct water (curve 312), although the permeate fluxes were relatively lower. The flux improved from 5.2 to 12.2 $m^3/m^2/d$ for California Aqueduct water as the powdered activated carbon concentration was increased from 0 to 3,000 mg/L.

In the case of deionized distilled water, there is no potential for membrane fouling due to membrane pore blockage due to suspended solids or due to concentration polarization caused by natural organic molecules. The increase in permeate flux at highs powdered activated carbon dosages can therefore be qualitatively explained by the boundary layer effect described above in the membrane transport model. The permeate mass transport rate across the hydrodynamic boundary layer is directly dependent on the thickness of the layer. At higher powdered activated carbon concentrations, the boundary layer thickness is potentially reduced, resulting in enhanced permeate transport across the membrane. Powdered activated carbon is very effective for increasing the permeate flux because it has a profound effect on reducing the hydrodynamic boundary layer thickness due to its morphological characteristics. Powdered activated carbon particles are irregular in shape and have angular edges with high surface roughness. This is an important consideration under turbulent flow conditions because rougher surfaces generate more eddies. The powdered activated carbon particles in the vicinity of the membrane therefore reduce the thickness of the laminar boundary layer, and consequently enhance the permeate flux.

The graph of FIG. 6 shows that the fractional improvement in permeate flux is significantly higher for California Aqueduct water (curve 312) than for deionized distilled water (curve 311). This is because the California Aqueduct water contains dissolved organic matter such as humic substances, and the large dissolved organic matter molecules potentially cause membrane fouling by pore blockage and/or gel formation due to polarization. The turbidity in California Aqueduct water (about 1.0 NTU (Nephelometric Turbidity Unit)) may also influence the permeate flux, but to a smaller extent. In this situation, the scrubbing effect of powdered activated carbon has a pronounced impact on flux improvement because the powdered activated carbon adsorbs a substantial portion of the dissolved organic matter. Therefore, reduction of the hydrodynamic boundary layer thickness and mitigation of polarization effects jointly contribute to the increase in permeate flux due to carbon addition.

Because the addition of powdered activated carbon will never decrease the permeate flux, carbon may be added slowly until the maximum permeate flux is obtained. For TCE removal, carbon is preferably added at the rate of 50–200 mg/L until a carbon concentration inside the system of approximately 5,000–10,000 mg/L is reached.

Effect of Inlet Pressure on Permeate Flux

Figure 7:
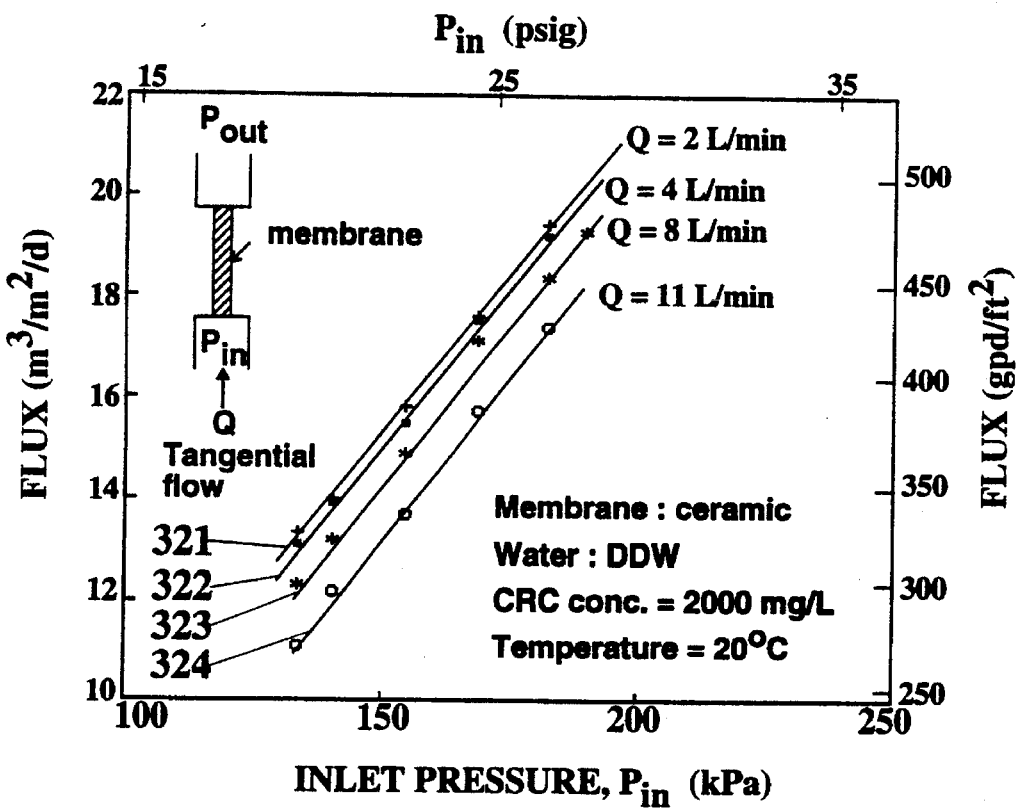
FIG. 7 is a graph illustrating the effect of inlet pressure on permeate flux in a system constructed in accordance with the present invention.

The variation of permeate flux as a function of the inlet pressure at the entrance of the membrane module was investigated for different recirculation (or crossflow) velocities ranging from 2 to 11 L/min. The temperature and the powdered activated carbon concentration inside the system were maintained at 68° C. and 2,000 mg/L, respectively. These studies were conducted with deionized distilled water and the results obtained are shown graphically in FIG. 7. Curves 321, 323 and 324 illustrate the results at recirculation velocities of 2, 4, 8 and 11 L/min respectively It can be seen that the permeate flux is a linear function of the inlet pressure, and the slopes of the lines obtained are the same for different recirculation rates. However, the permeate flux corresponding to a certain system pressure is lower for higher recirculation velocities. This is because the pressure losses across the membrane module are higher at higher recirculation velocities, and the transmembrane pressure (the driving force) is thereby lowered.

Effect of Crossflow Velocity on Permeate Flux

Figure 8:
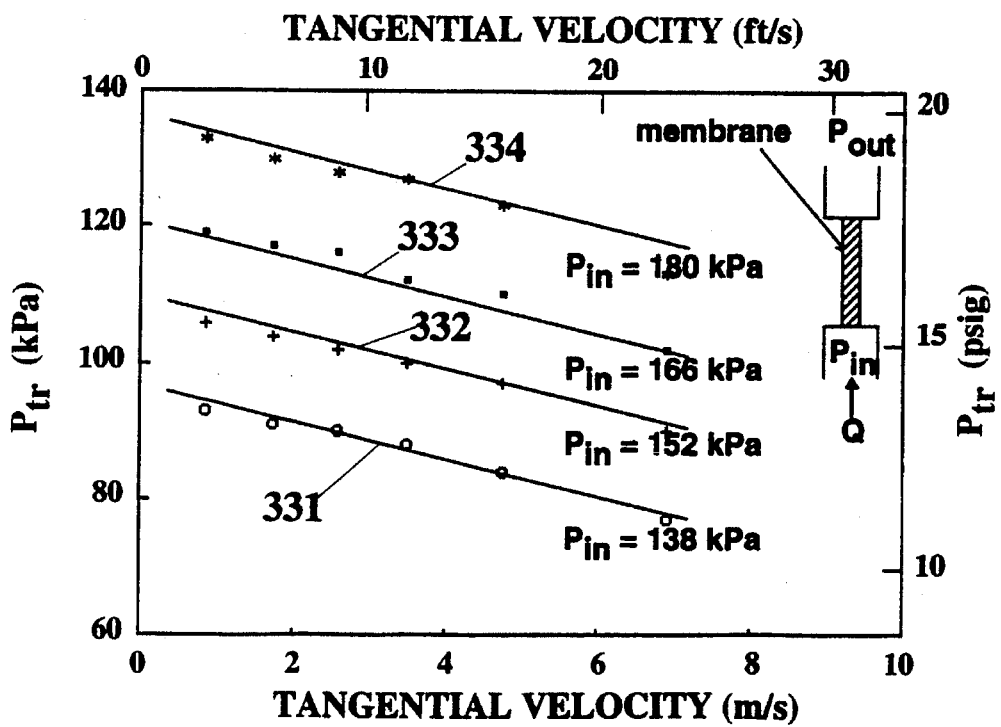
FIG. 8 is a graph illustrating the relationship between average transmembrane pressure and tangential velocity in a system constructed in accordance with the present invention.

The effect of the membrane module inlet pressure was also studied as a function of the crossflow velocity for different entrance pressures, and the corresponding plots are illustrated in the graph of FIG. 8. Curves 331, 332, 333 and 334 are plots for inlet pressures of 138, 152, 166 and 180 kPa, respectively. It is evidenced from the graph that the pressure drop along the membrane varies linearly with the crossflow rate. This can be explained in the context of fluid flow through tubes, where higher energy losses are sustained at increased crossflow velocities. The slopes of the curves shown are approximately the same for different entrance pressure conditions.

Relation Between Permeate Flux and the Transmembrane Pressure

The transmembrane pressure, Ptr, is the driving force for permeate transport. The average transmembrane pressure can be estimated from the following relation suggested by R. S. Tutunjian in his article "Scale-Up Considerations for Membrane Processes," *Biotechnology*, vol. 3, pp. 615–626 (1985):

$$P_{tr}=(P_1+P_2)/2-P_{pe} \tag{13}$$

where $P_1$ and $P_2$ are the pressure at the inlet and outlet of the microfiltration module, respectively, and $P_{pe}$ is the permeate pressure. The permeate pressure is negligible and can be assumed to be zero, so that $$P_{tr}=(P_1+P_2)/2 \tag{14}$$

The average transmembrane pressure applied, $(P_1+P_2)/2$, is a measure of the driving force for permeate transport. Permeate flux data are plotted in the graph of FIG. 9 for California Aqueduct water. Three different cases were considered for the same powdered activated carbon concentration of 3,000 mg/L, namely, California Aqueduct water with no background substances (curve 341), California Aqueduct water with 5 mg/L TCE (curve 342), and California Aqueduct water with 5 mg/L TCE and 5 mg/L humic acid (curve 343). A linear relationship can be observed between the permeate flux and transmembrane pressure, regardless of the crossflow velocity for each case. The flux versus transmembrane pressure plots for California Aqueduct water without background substances (curve 341) and California Aqueduct water with 5 mg/L TCE (curve 342) nearly coincide, which indicates that TCE has no effect on the permeate transport. On the other hand, the data corresponding to California Aqueduct water with 5 mg/L humic acid and 5 mg/L TCE (curve 343) show that permeate fluxes are lower in the presence of humic acid. These observations are consistent with theoretical developments according to which the TCE molecules that are relatively small do not lead to polarization and gel formation. On the other hand, humic acid consists of macromolecules, and the higher molecular weight fractions can potentially cause pore blocking or gel formation, reducing the effectiveness of membrane filtration.

Figure 9:
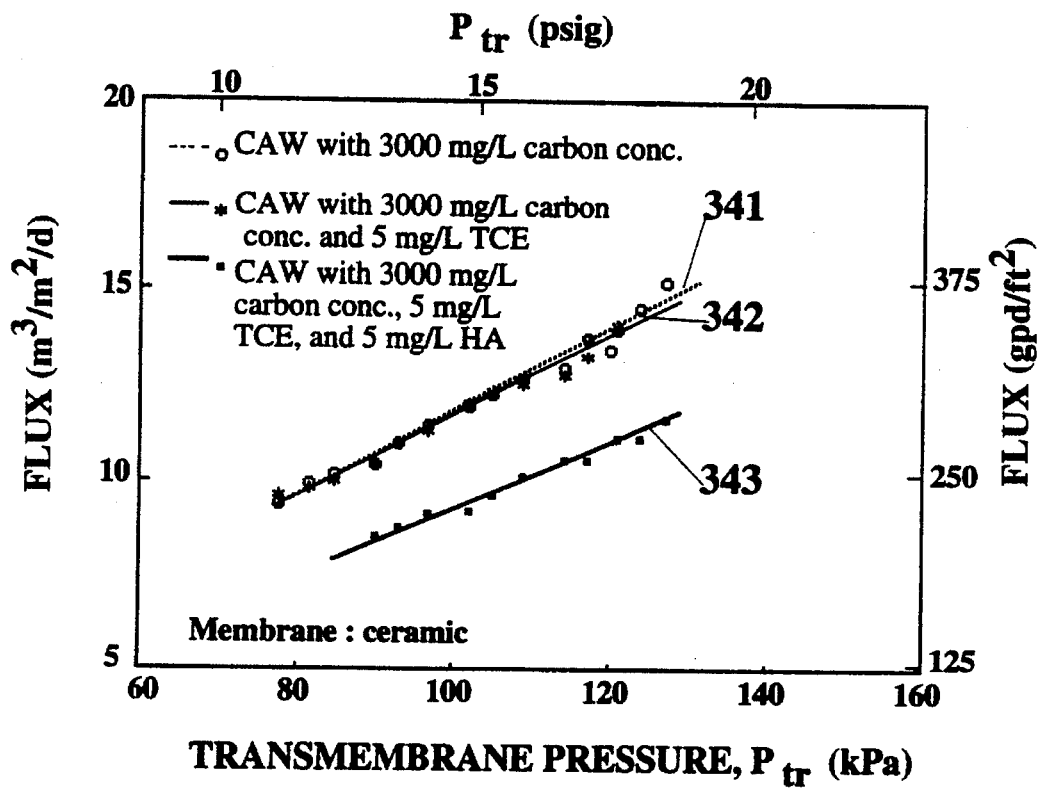
FIG. 9 is a graph illustrating the relationship between average transmembrane pressure and permeate flux in a system constructed in accordance with the present invention.
Figure 10:
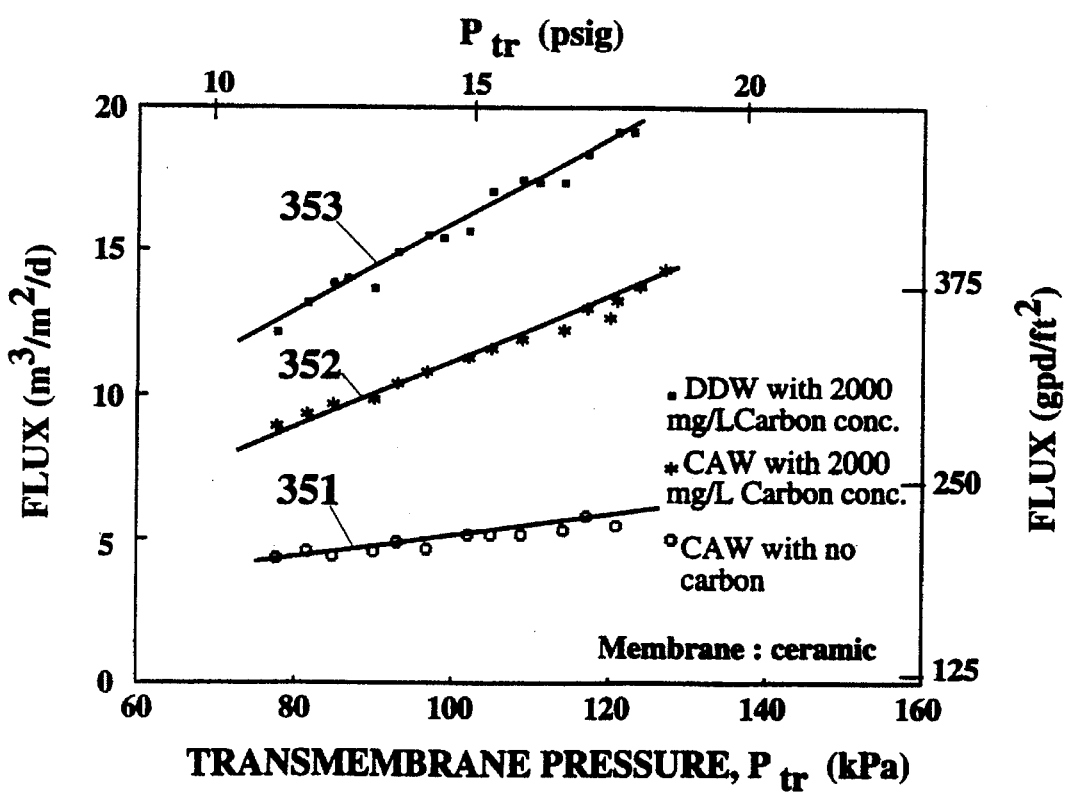
FIG. 10 is a graph also illustrating the relationship between average transmembrane pressure and permeate flux in a system constructed in accordance with the present invention.

Permeate flux data similar to FIG. 9 are shown in the graph of FIG. 10, comparing the results for California Aqueduct water (curve 351), California Aqueduct water with 2,000 mg/L powdered activated carbon (curve 352), and deionized distilled water with 2,000 mg/L powdered activated carbon (curve 353). The flux versus transmembrane pressure plots follow the same linear pattern observed in FIG. 8. It can be noted that the fluxes for deionized distilled water are nearly twice those obtained for California Aqueduct water (for 2,000 mg/L powdered activated carbon concentration). This can be explained by the fact that the California Aqueduct water contains naturally occurring organics such as humic substances which reduce the membrane efficiency. The fluxes corresponding to California Aqueduct water without carbon are about 35–40% of those obtained for California Aqueduct water with powdered activated carbon. Furthermore, a comparison of FIGS. 8 and 9 shows that the fluxes for California Aqueduct water with no carbon are about half those obtained for California Aqueduct water with TCE and humic acid using powdered activated carbon, corresponding to similar transmembrane pressures. This high reduction in flux when no carbon is employed illustrates the importance of powdered activated carbon particles in enhancing membrane efficiencies. The powdered activated carbon adsorbs most of the humic acid and other natural organics, and considerably reduces membrane fouling. More significant is the flux improvement caused by possible reduction in thickness of the hydrodynamic boundary layer due to powdered activated carbon particles. The reduction in boundary layer thickness even offsets the disadvantage of filtering California Aqueduct water with 5 mg/L humic acid.

Thus, it can be seen that the system of the present invention is self-cleansing.

Comparison between Ceramic and Polymeric Membranes

Figure 11:
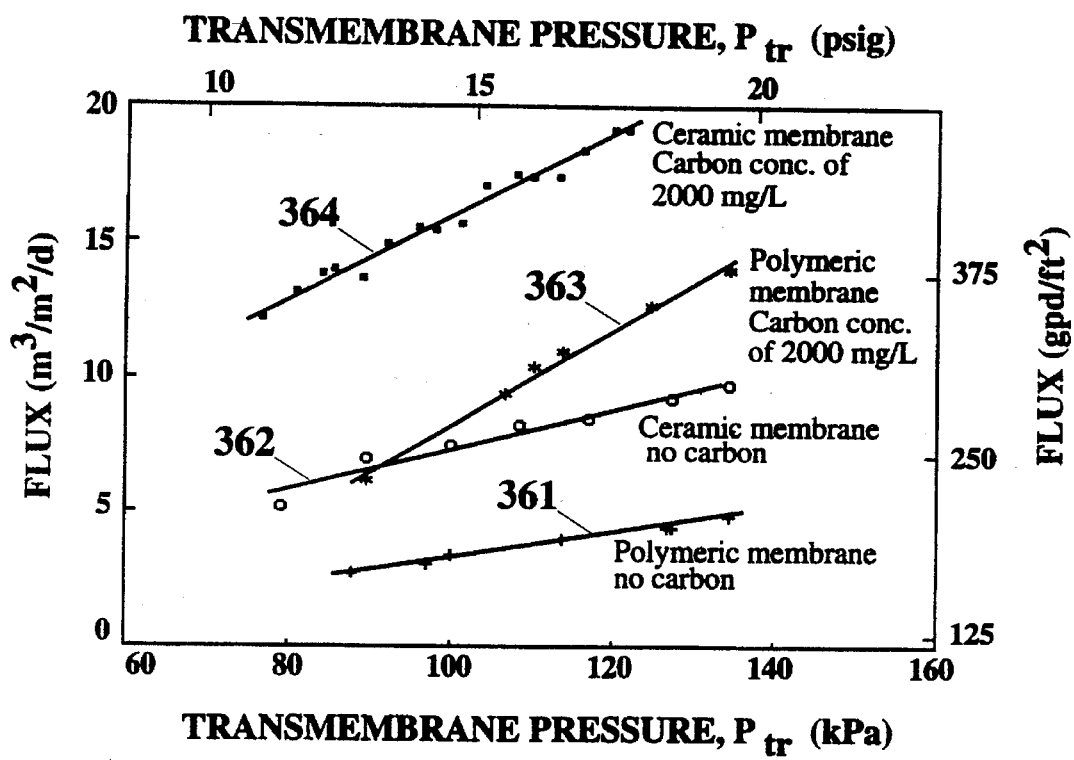
FIG. 11 is a graph illustrating the comparison between ceramic and polymeric membranes.

An important aspect of this study is the comparison between polymeric and ceramic membranes for the microfiltration and adsorbent particle suspension process application. FIG. 11 compares the performance of the two types of membranes with and without carbon, using deionized distilled water. Curves 361 and 362 illustrate the performances of a polymeric membrane and a ceramic membrane, respectively, with no carbon. Curves 363 and 364 illustrate the performances of a polymeric membrane and a ceramic membrane, respectively, with a carbon concentration of 2000 mg/L. It is evidenced from FIG. 11 that permeate fluxes for both membranes, corrsponding to similar transmembrane pressures, were at least doubled when carbon was used in the system. However, the fluxes obtained using ceramic membranes were significantly higher than those obtained using polymeric membranes.

Economics of the Microfiltration and Adsorbent Particle Suspension Technology for Water Treatment The most important consideration in full-scale implementation of any technology is its cost effectiveness. For the microfiltration and adsorbent particle suspension system employing a ceramic membrane, the permeate flux range is about 250 gpd/ft$^2$ (10 m$^3$/m$^2$/day) under the least favorable operating conditions, for raw waters with high levels of turbidity, containing dissolved organic matter. Nonetheless, if inlet pressures are increased from 20 to 30 psi or higher values, the flux can easily be improved to 500 gpd/ft$^2$. For cost estimation purposes, a very conservative average flux of 250 gpd/ft$^2$ could be assumed. The cost averages around $200/ft$^2$ (range of $80–300/ft$^2$) for ceramic membranes, in comparison with that of $50/ft$^2$ (range of $6–70/ft$^2$) for polymeric membranes. Assuming a conservative value of 8 years for the life span of ceramic membranes (normal life expectancy is over 10 years), the operating cost for the microfilter membrane can be estimated to be $0.044/1000 gal (including labor, cleaning costs, and amortization). At an average powdered activated carbon usage of 50 mg/L and a carbon cost of $0.35/lb, without considering regeneration, the powdered activated carbon cost amounts to $0.146/1000 gal., and the spent carbon disposal costs can be $0.10/1000 gal. treated. Hence, the total operation and maintenance cost for the microfiltration and adsorbent particle suspension system is $0.29/1000 gal. This is indeed a conservative estimate in view of the following factors: (i) carbon regeneration, which will lower powdered activated carbon costs is not considered; (ii) the microfiltration and adsorbent particle suspension system requires lower power consumption than the ultrafiltration system which is operated at higher pressures; and (iii) the powdered activated carbon costs are based on TCE which is poorly adsorbed in comparison with other organic pollutants; and (iv) the use of 50 mg/L powdered activated carbon can achieve final TCE concentrations that are an order of magnitude lower than the maximum contaminant level of 5 μg/L. An operation and maintenance cost range of $0.20–0.30/1000 gal can be fixed for the microfiltration and adsorbent particle suspension system using the ceramic membrane. Based on this estimate, the technology will be more cost-effective than any combination of treatment processes to achieve the same quality of treatment obtainable in the microfiltration and adsorbent particle suspension process.

What is claimed is:

1. An apparatus for removing contaminants from raw water and obtaining drinking water fit for human consumption, said apparatus comprising:

an influent reservoir containing raw water;

a pump connected between said influent reservoir and an input pipe;

a carbon slurry reservoir containing powdered activated carbon;

a pump connected between said carbon slurry reservoir and said input pipe;

a recirculation reservoir connected to said input pipe, said recirculation reservoir containing raw water fed from said input pipe, an adsorbent particle suspension of said powdered activated carbon from said carbon slurry reservoir and said raw water, said adsorbent particle suspension at a pressure greater than atmospheric pressure, at least one sampling port, at least one temperature probe, and at least one pressure gauge, wherein said activated carbon contains radon and humic acid adsorbed from said raw water;

a ceramic microfiltration tubular membrane connected in a cross-flow filtration configuration, containing said adsorbent particle suspension from said recirculation reservoir inside said membrane at Reynolds numbers in the range of 20,000 to 40,000, and permeated drinking water outside said membrane, wherein the rate of production of said permeated drinking water is greater than 200 gallons per square foot per day;

a porous membrane support layer underneath said membrane;

a recirculation output pipe connected between said recirculation reservoir and one end of said membrane;

a positive displacement pump connected between said recirculation reservoir and said membrane;

a bypass pipe connected between said positive displacement pump and said recirculation input pipe, said bypass pipe containing a ball valve therein;

a permeate reservoir containing drinking water fit for human consumption; and a permeate output pipe containing said permeate from said membrane, said permeate output pipe connected between said membrane and said permeate reservoir wherein all components of said apparatus are sealed such that there can be no escape of gas or liquid from any part of said apparatus between said input pipe and said permeate output pipe, including all valves, fittings, and gauges.

* * * * *